United States Patent [19]
Nodov

[11] Patent Number: 4,459,618
[45] Date of Patent: Jul. 10, 1984

[54] LINE SOURCE ILLUMINATOR

[75] Inventor: Eugene Nodov, Richardson, Tex.

[73] Assignee: The Mead Corporation, Dayton, Ohio

[21] Appl. No.: 75,053

[22] Filed: Sep. 12, 1979

[51] Int. Cl.$^3$ .............................................. H04N 1/10
[52] U.S. Cl. ....................................... 358/293; 355/8
[58] Field of Search ................... 355/8, 55, 30, 70, 67; 358/293; 350/290

[56] References Cited

U.S. PATENT DOCUMENTS

| | | | |
|---|---|---|---|
| 2,262,584 | 11/1941 | Herriott | 358/293 |
| 3,304,365 | 2/1967 | Mills | 358/293 |
| 3,645,600 | 2/1972 | Doctoroff et al. | 350/290 |
| 3,694,070 | 9/1972 | Libby | 355/8 |
| 3,758,774 | 9/1973 | Hildenbrandt | 355/8 |
| 3,797,908 | 3/1974 | Ward et al. | 358/293 |
| 4,095,881 | 6/1978 | Maddox | 355/30 |
| 4,112,469 | 9/1978 | Paranupe et al. | 358/293 |
| 4,189,763 | 2/1980 | Sozuki et al. | 355/8 |

OTHER PUBLICATIONS

Bullock et al.–Ink Jet Copier–IBM Tech Disclosure Bulletin, vol. 16, #4, Sep. 1973, pp. 1254, 1255.

*Primary Examiner*—Joseph A. Orsino, Jr.
*Attorney, Agent, or Firm*—Biebel, French & Nauman

[57] ABSTRACT

Apparatus for illuminating a narrow transverse strip on a document. The apparatus includes a pair of laterally extending illumination lamps and a pair of trough shaped reflectors for collecting light from the illumination lamps and focussing one-dimensional images of the lamp filaments along a common line extending across the document. Each trough shaped reflector has an associated flat reflecting mirror for directing its beam of illuminating light toward the document. The two flat mirrors are rotated in synchronism for scanning the light beams longitudinally along the document. The trough shaped reflectors are moved in synchronism with the scanning movement of the beams so that the images of the lamp filaments remain in one-dimensional focus throughout scanning of the flat document plane. The illuminating light is further collected and directed toward the document by a pair of reflective side surfaces which define walls for the illumination station.

6 Claims, 5 Drawing Figures

LINE SOURCE ILLUMINATOR

CROSS-REFERENCE TO RELATED APPLICATIONS

This application is related to application Ser. No. 075,063 entitled Jet Drop Copying Apparatus, Application Ser. No. 075,297 entitled Document Illumination Apparatus and Application Ser. No. 075,054 entitled Document Illumination System all filed on even date herewith and assigned to the assignee hereof.

BACKGROUND OF THE INVENTION

This invention relates generally to document illumination systems and more particularly to document illumination systems which are adapted for use in a high speed jet drop copier. A typical prior art illumination system for a jet drop copier is disclosed in Paranjpe et al U.S. Pat. No. 4,112,469. The system as disclosed is a pair of stationary illumination lamps and reflectors.

An illumination arrangement as disclosed in Paranjpe et al provides only a relatively low level of illumination across the face of the document being copied. This relatively low level of incident light is reflected through a set of imaging optics for focussing against the face of a photodetector array. The photodetectors comprising the photodetector array generate jet drop printing control signals in response to the light reflected from the document.

The signals generated by the photodetectors in response to light received from the document must compete with noise signals which are inherently generated by the system electronics. When the light levels are quite low, the photodetectors must have a relatively long observation time in order to generate reliable printing control signals. Thus as the copying speed increases, there is a requirement for a concomitant increase in the level of illuminating light. In the specific jet drop copying system for which the present invention is intended, document scanning is carried out at a linear speed in the order of about 128 in. per second, and the scanning resolution is about 535 lines per inch. This means that the photodetector observation time is only about 14.6 microseconds. In order for such a system to tolerate normal optical system losses and to achieve a photodetector signal-to-noise ratio of 20 db, an illumination level of about 0.38 watts per $cm^2$ is required. This illumination level is much higher than that which is provided by conventional document illumination systems.

SUMMARY OF THE INVENTION

In accordance with this invention a one-dimensional image of a line source of illumination is projected upon the face of a flat document and scanned thereacross. This produces an intensely illuminated narrow strip, which moves across the document surface for concomitant scanning by an appropriate strip imaging device. The one dimensional image is sharply defined along the document surface in a direction perpendicular to the axis of the image and is entirely undefined in a direction along the image axis. Thus the illumination is completely uniform along the illuminated strip and is without any visual definition of the illumination generating lamp filament.

The production of the one dimensional line source image is produced by an anamorphic imaging system, which is preferably a trough type reflector facing the illumination source in parallel relation therewith. The line source image is maintained in focus during scanning by synchronous refocussing of the imaging system.

Scanning is preferably accomplished by a flat scanning mirror which faces both the trough reflector and the document surface and which is rotated about an axis parallel to the illumination source. In order to accommodate scanning illumination of a flat document plane the trough reflector is moved refocussingly toward and away from the illumination line source in synchronism with the scanning motion of the scanning mirror. Document overheating may be prevented by providing the scanning mirror with a dichroic coating for reflecting visible light while transmitting a major portion of the incident infrared energy. The transmitted infrared energy is absorbed by an air cooled heat sink.

DESCRIPTION OF THE PREFERRED EMBODIMENT

Figure 1:
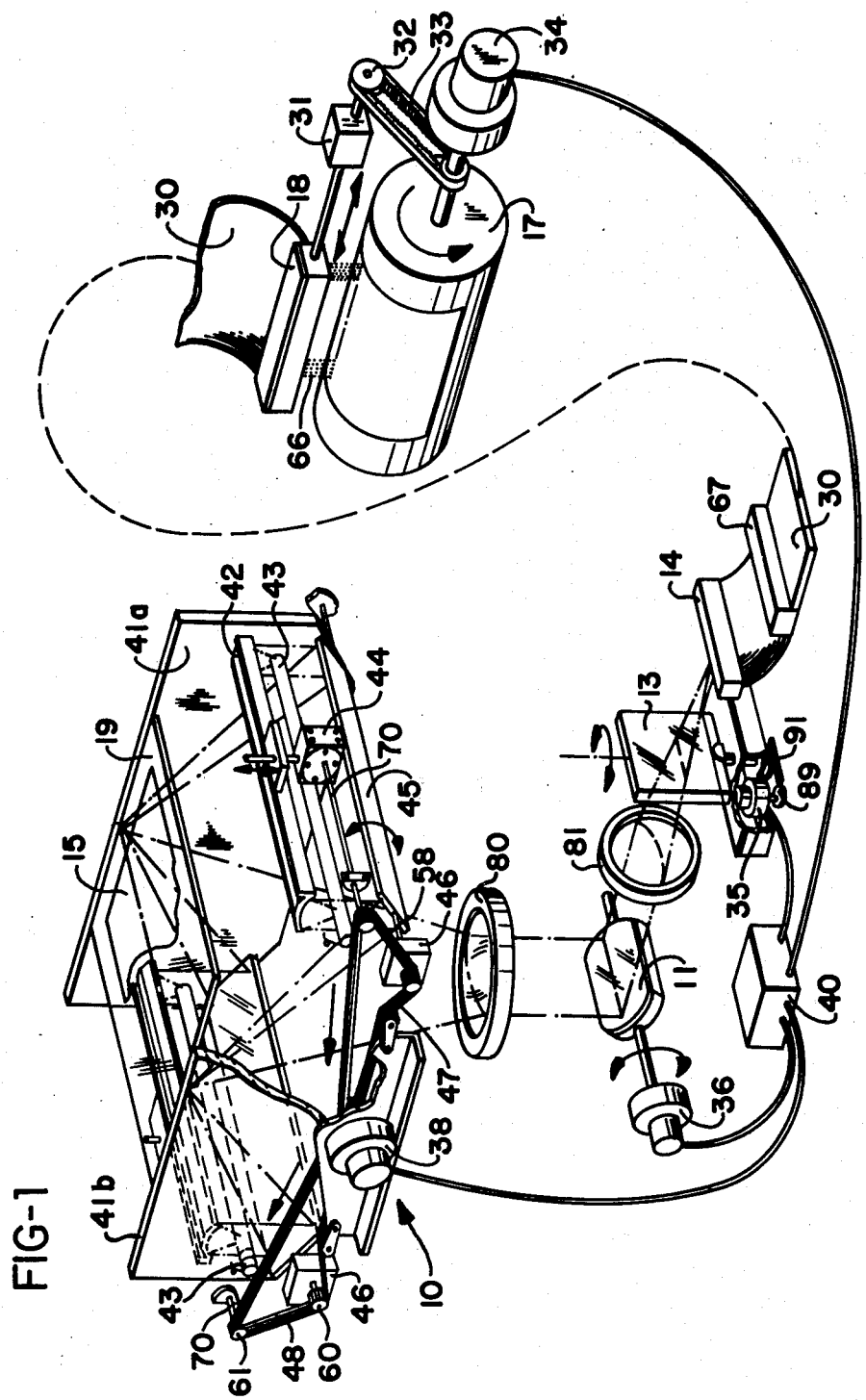
FIG. 1 is a pictorial drawing of a jet drop copying or duplicating system.

The preferred embodiment of this invention is particularly adapted for use in a jet drop copying or duplicating system, as generally illustrated in FIG. 1. The overall system generally comprises an illumination station 10, a scanning mirror 11, a collimating lens 80, an imaging lens 81, an image shifting plate 13, a photodetector array 14, an ink jet print head 18, and a drum 17 for supporting a print sheet 16.

Illumination station 10 includes a flat plate 19 for supporting an original document 15. The docment 15 is scanned by two synchronously driven narrow beams of light, as hereinafter described, to create a narrow illuminated strip extending across one dimension of the document. The document portion which is so illuminated is imaged upon the face of photodetector 14. Photodetector array 14 supplies scanning signals to a printing controller 67 which is connected via a set of electrical cables 30 to ink jet print head 18.

Printing controller 67 comprises a series of amplifiers which generate binary printing control signals as generally taught in Taylor et al U.S. Pat. No. Re. 28219. Printing head 18 produces a series of printing streams 66 which are controlled by the binary printing control signals to produce a representation of the scanned area of document 15 upon the surface of print sheet 16. Printing streams 66 comprise uniformly sized and regularly spaced drops, as taught in Taylor et al, and the streams are positioned in correspondence with the positioning of the photodiodes comprising the array 14. The drop streams are selectively charged, deflected and caught under control of the binary printing control signals, so that the printed pattern on print sheet 16 comprises a series of uncharged and undeflected drops.

It is contemplated that the jets comprising the jet array be quite close together, but not so close together as to provide side-by-side overlapping print traces. A cam arrangement 31 oscillates print head 18 from side-to-side, thereby achieving the overlapping which is required for solid printing coverage. Cam arrangement 31 is driven by drive motor 34, timing belt 33 and timing gear 32. Drive motor 34 also drives printing drum 17, as illustrated in FIG. 1. The system is designed to print from right-to-left and from left-to-right, so that flyback of print head 18 is not required.

Image scanning is carried out by an imaging system comprising collimating lens 80, image scanning mirror 11, imaging lens 81, and image shifting plate 13. A servomotor 36 rotates scanning mirror 11 forwardly in synchronism with the rotary motion of printing drum 17, and this forward scanning motion is followed by a high speed flyback during the period of time when the backside of printing drum 17 is being presented to the printing jets 66. A stepping motor 35 rotates a cam 89 for moving a cam follower 91 to rotate the plate 13. Image shifting plate 13 comprises a refractive glass plate for lateral angular image shifting in 0.5° steps, as described in Ser. No. 075,063. Lateral image shifting proceeds in synchronism with the oscillating movement of print head 18. Drive motor 34, servomotor 36 and stepping motor 35 all operate under common control of a control unit 40.

Figure 2:
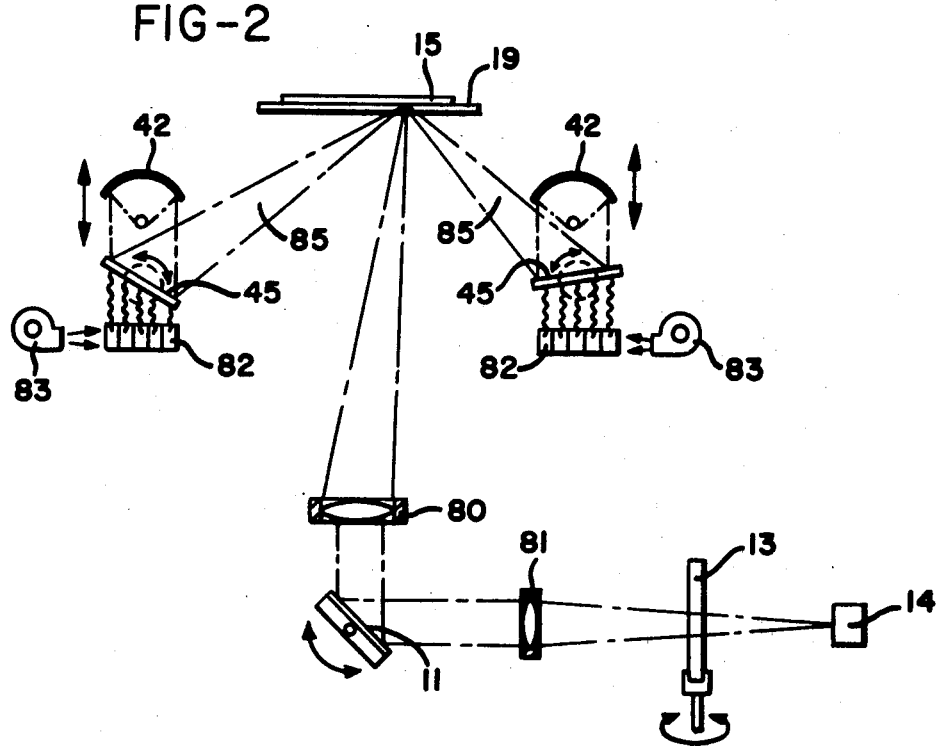
FIG. 2 is a schematic illustration of document illumination and imaging as seen in side elevation.
Figure 3:
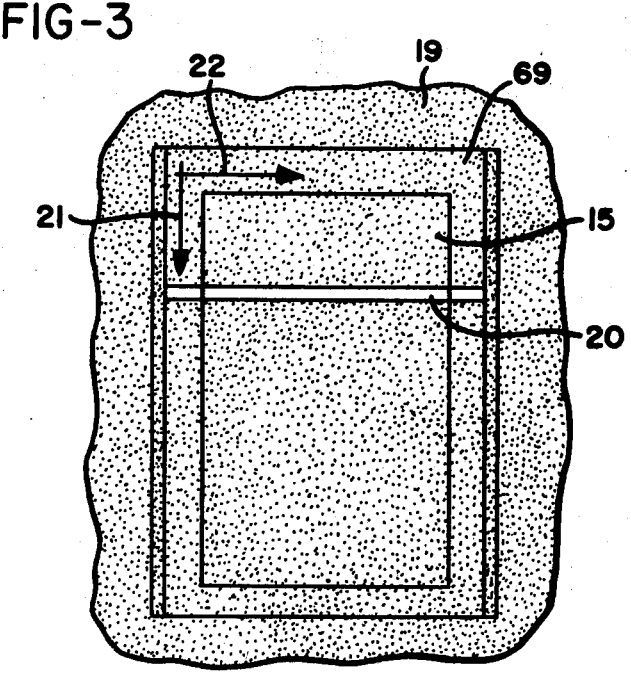
FIG. 3 is a schematic illustration of illumination of a document plane.

FIG. 2 presents a schematic illustration of image scanning by the above described apparatus. Also presented in FIG. 2 is a schematic illustration of document illumination by apparatus configured in accordance with the preferred embodiment of this invention. The schematic illustration of document illumination is supplemented by the further schematic illustration of FIG. 3, wherein the document 15 is illustrated as being positioned upon a supporting glass plate 69 within the support surface 19. Document 15 is shown as being illuminated by an elongated beam of light to create a narrow illuminated strip 20 extending laterally across the document in a first direction parallel to the directional arrow 22. The beam of illuminating light is scanned longitudinally across document 15 in a second direction as indicated by the arrow 21.

Apparatus for creating and scanning the illuminated strip 20 includes a pair of line source illuminators 43, 43, a pair of focussing reflectors 42, 42, and a pair of scanning mirrors 45, 45. The illuminators 43, 43, extend transversely across illuminating station 10 as best illustrated in FIG. 1. Light which is generated by the illuminators is focussed by focussing reflectors 42, 42, into a pair of converging light beams 85, 85. Light beams 85, 85, are directed toward mirrors 45, 45, which have a dichroic coating for selectively transmitting infrared energy toward heat sinks 82, 82. A pair of blowers 83, 83, blow cooling air over heat sinks 82, 82.

The dichroic coating on mirrors 45, 45, preferably comprises alternating layers of silicon dioxide and titanium dioxide. The coating may have a peak transmission wavelength of 9000 Angstroms and is highly reflective to energy in the visible spectrum. Thus the beams 85, 85, are converted into beams of primarily visible light, which are directed convergingly toward document 15 by the mirrors 45, 45. The convergence of beams 85, 85, at the surface of document 15 defines illuminated strip 20. Scanning of beams 85, 85, is accomplished by synchronous rotary oscillation of mirrors 45, 45, under control of a pair of first cam mechanisms 46, 46. Cam mechanisms 46, 46, also provide a high speed flyback for mirrors 45, 45.

Illuminated strip 20 comprises superimposed one-dimensional images of the electrical filaments within illumination lamps 43, 43. In order to maintain one-dimensional focus of the filaments, reflectors 42, 42, are given a vertically repositioning motion by a pair of second cam mechanisms 44, 44. Cam mechanisms 44, 44, 46 and 46 are commonly driven by drive motor 38 and timing belt arrangements 47 and 48, so that movement of reflectors 42, 42, proceeds in synchronism with the scanning oscillation of mirrors 45, 45. This maintains the illuminated strip 20 at the proper position for both of reflectors 42, 42, and produces a very narrow and intense strip of illumination. For a description of the operation of the cam mechanisms, reference may be made to Ser. No. 075,054.

Preferably reflectors 42, 42, are of generally trough-shaped configuration with a cross-section defining an ellipse sector. This configuration produces the above mentioned one-dimensional image of the illumination filaments, which is sharply defined in the longitudinal direction and completely out of focus in the lateral direction. Thus there is no observable representation of the actual structure of the electrical filaments.

In a typical application the document plane may extend about 7 inches on each side of the plane of symmetry of illumination station 10. For such an arrangement the illumination lamps may be positioned about 7 inches below the document plane and have a horizontal separation of about 27.5 inches. Reflectors 42 may have a nominal position which is about 4.9 in. above their illumination lamps 43, and the vertical movement of reflectors 42 may be in the order of about ±0.1 inch. For producing the beams 85, reflectors 42 may be configured as sectors of an ellipse having a semi major axis of 15.1 inches and a semi minor axis of 11.1 inches; the illumination lamps 43 being positioned along the semi major axes of such ellipses. Such an arrangement has been found to be effective for maintaining filament focus and also for minimizing variations in the intensity of the illumination radiated upon the document plane.

It can be seen that as the beams 85, 85, scan across the document plane, they alternately grow longer and shorter. When the one beam is at its maximum length, then the other beam is at its minimum. During the course of one complete scan, the path length extending from either of reflectors 42 down to the corresponding mirror 45 and thence to the face of document 15 varies from about 22 inches to about 32 inches. In accordance with physical laws governing the propagation of radiation, the intensity of the illumination received by the strip 20 from one of the reflectors 42 is inversely proportional to the overall path length of the corresponding beam 85. Thus as one of the beams 85 lengthens, its illumination contribution to the strip 20 decreases. However, the other beam 85 is simultaneously growing shorter, so that its illumination contribution to the strip 20 increases. The cooperative scanning action of the two beams 85 thereof produces a balance of illumination throughout the scan.

It will be appreciated that the required one-dimensional images of the lamp filaments may be created by anamorphic optical means other than trough type reflectors. A similar effect may be achieved, for instance by an alternative embodiment comprising a cylinder lens. Such a lens may be scanningly rotated in a manner similar to the rotation of mirrors 45, 45, and the axis of rotation may be translated, to maintain a conjugate focal relationship throughout the scan.

Figure 4:
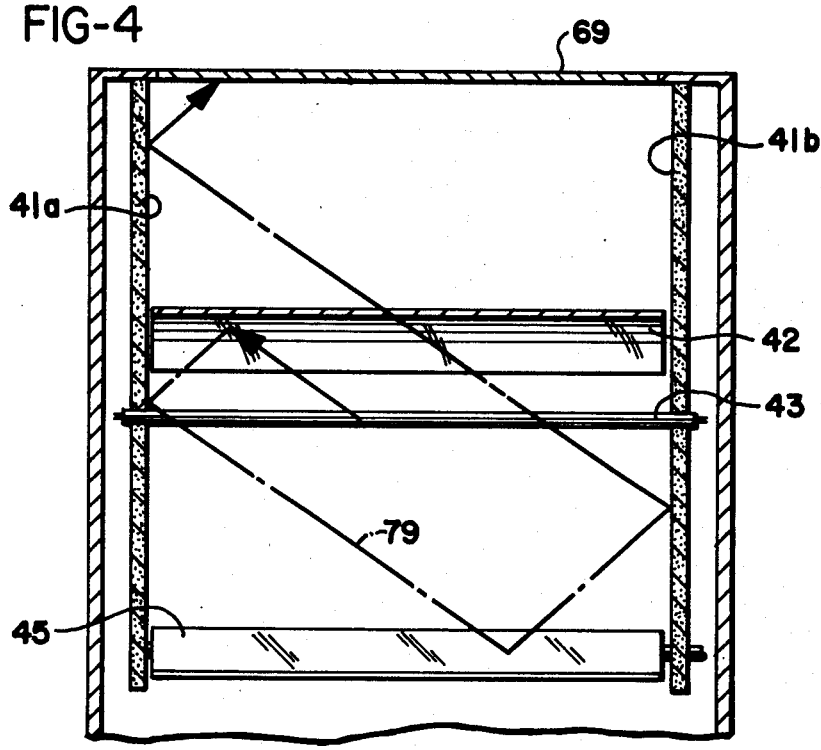
FIG. 4 is a crossectioned front elevation view of an illumination station.
Figure 5:
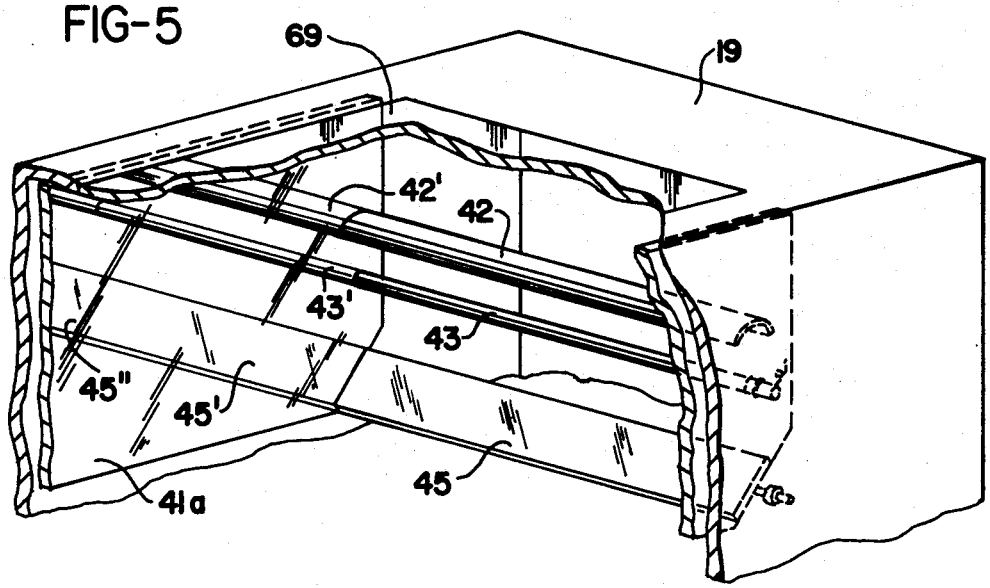
FIG. 5 is a partially cut away pictorial illustration of an illumination station.

The creation of the intense, superimposed one-dimensional images of the electrical filaments of lamps 43, 43, is substantially enhanced by reflective side surfaces 41a and 41b, as generally illustrated in FIGS. 4 and 5. Reflective surfaces 41a and 41b intercept sidewardly directed light and redirect it laterally inwardly toward the illuminated strip 20. This is best understood by referring to FIG. 4 and noting the path of a representative light ray 79. The ray leaves its illumination lamp 43 along a generally upward and sideward path. The ray first reaches the trough reflector 42 and then follows a downward and sideward path toward the left side mirror 41a. Mirror 41a reflects the ray inwardly and downwardly toward scanning mirror 45. Scanning mirror 45 then directs the ray upwardly toward glass plate 69. During its upward travel toward glass plate 69, the ray is reflected inwardly once by right side mirror 41b and once again by left side mirror 41a.

The net result of the light redirection by the side mirrors 41a and 41b is the creation of an illumination source of effectively infinite length. This is illustrated in FIG. 5, which illustrates the illumination station as it actually appears on visual inspection. Each of the side mirrors 41a and 41b present a series of images extending toward infinity. Thus FIG. 12 illustrates a first image 42' of focussing reflector 42, a first image 43' of illumination lamp 43 and first and second images 45' and 45" of scanning mirror 45. Side mirrors 41a and 41b increase the illumination level at the document plane by a factor of about 3.2 in a typical embodiment as herein described. When such an embodiment uses a pair of illumination lamps 43, 43, having tungsten filaments and ratings of 1000 watts each, then an illumination level of about 1 watt per cm$^2$ is achieved at the illuminated strip 26.

Motor 38 is controlled by control unit 40, so that the scanning of document 15 by the light beams 85, 85, proceeds in synchronism with the rotary oscillation of image scanning mirror 11. Thus photodetector array 14 senses the various areas of document 15 concomitantly with the illumination of those areas by light beams 85, 85.

While the form of apparatus herein described constitutes a preferred embodiment of the invention, it is to be understood that the invention is not limited to this precise form of apparatus, and that changes may be made therein without departing from the scope of the invention.

What is claimed is:

1. Apparatus for illuminating a flat document surface comprising a line source of illumination, anamorphic optical means for receiving illumination from said line source and directing a substantially one-dimensional image of said line source upon the face of said document, a rotary scanner which rotates about an axis parallel to said line source for causing said image to move across said document in a direction perpendicular to the direction of image extent, and refocussing means for adjusting the focus of said optical means in synchronism with said image movement.

2. Apparatus according to claim 1 wherein said anamorphic optical means further comprises a trough type reflector which faces said line source; said refocussing means comprising means for adjusting the distance between said line source and said reflector.

3. Apparatus according to claim 2 wherein said rotary scanner comprises a flat mirror for reflecting visible light which has been radiated by said line source and reflected from the surface of said trough type reflector.

4. Apparatus according to claim 3 wherein said flat mirror comprises a dichroic coating for reflecting said visible light while transmitting a major portion of the infrared energy incident thereon.

5. Apparatus according to claim 4 and further comprising a heat sink for absorbing infrared energy transmitted through said dichroic coating.

6. Apparatus according to claim 5 and further comprising cooling means for cooling said heat sink.

* * * * *